United States Patent
Choiniere et al.

(10) Patent No.: US 10,962,990 B2
(45) Date of Patent: Mar. 30, 2021

(54) ATTITUDE DETERMINATION BY PULSE BEACON AND LOW COST INERTIAL MEASURING UNIT

(71) Applicant: BAE SYSTEMS Information and Electronic Systems Integration Inc., Nashua, NH (US)

(72) Inventors: Michael J. Choiniere, Merrimack, NH (US); Jason H. Batchelder, Lyndeborough, NH (US); Matthew F. Chrobak, Groton, MA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 39 days.

(21) Appl. No.: 16/534,040

(22) Filed: Aug. 7, 2019

(65) Prior Publication Data
US 2021/0041897 A1   Feb. 11, 2021

(51) Int. Cl.
*G05D 1/10* (2006.01)
*F42B 15/01* (2006.01)
*F41G 7/36* (2006.01)
*F42B 15/10* (2006.01)
(Continued)

(52) U.S. Cl.
CPC ............ *G05D 1/107* (2013.01); *F41G 7/36* (2013.01); *F42B 15/01* (2013.01); *F42B 15/10* (2013.01); *G05D 1/12* (2013.01)

(58) Field of Classification Search
CPC .......... G05D 1/107; G05D 1/12; F24B 15/01; F24B 15/10; F41G 7/36; F41G 3/145; F41G 7/305; F41G 7/303; F41G 7/26; G01C 21/165; G01S 11/02
See application file for complete search history.

(56) References Cited

U.S. PATENT DOCUMENTS 4,219,170 A * 8/1980 Esker .................. F41G 7/26
                                            244/3.14
4,232,313 A   11/1980 Fleishman
(Continued)

FOREIGN PATENT DOCUMENTS

WO   2019067788 A1   4/2019

OTHER PUBLICATIONS

Tian et al., "Attitude Angle Compensation for a Synchronous Acquisition Method Based on an MEMS Sensor", Jan. 24, 2019, retrieved on [Aug. 10, 2020]. Retrieved from the internet <URL: https://www.mdpi.com/1424-8220/19/3/483/htm> entire document.
(Continued)

*Primary Examiner* — Bernarr E Gregory
(74) *Attorney, Agent, or Firm* — KPIP Law, PLLC

(57) ABSTRACT

The system and method of attitude determination by pulse beacon and extremely low cost inertial measuring unit. A pulse beacon is used to generate a plurality of pulses detected by a detector or receiver located on the rear of a projectile such that direction of arrival can be determined. A synchronized clock proved for velocity and range information. Altitude can also be determined and may use an altimeter or the like. The use of a low cost IMU is possible with internal calibration by the system. Real-time attitude information provides for correction for crosswind and other drift enabling the system to have less down range dispersion.

20 Claims, 5 Drawing Sheets

(51) Int. Cl.
  *G05D 1/12* (2006.01)
  *F41G 7/00* (2006.01)

(56) References Cited

U.S. PATENT DOCUMENTS

| | | | | |
|---|---|---|---|---|
| 5,039,029 A * | 8/1991 | Taylor | ............... | G01S 11/02 244/3.11 |
| 5,099,246 A * | 3/1992 | Skagerlund | ............ | F41G 7/305 342/361 |
| 5,163,637 A * | 11/1992 | Hansen | ............... | F41G 7/305 244/3.21 |
| 5,259,567 A * | 11/1993 | Jano | ............... | F41G 7/305 244/3.11 |
| 5,414,430 A * | 5/1995 | Hansen | ............... | F41G 7/305 342/188 |
| 5,425,514 A * | 6/1995 | Grosso | ............... | F41G 3/145 244/3.22 |
| 5,490,643 A * | 2/1996 | Jano | ............... | F41G 7/305 244/3.11 |
| 5,661,555 A * | 8/1997 | Romer | ............... | F41G 7/305 244/3.13 |
| 5,708,583 A * | 1/1998 | Solenne | ............... | F41G 7/305 701/4 |
| 5,896,106 A * | 4/1999 | Seidensticker | ......... | F41G 7/305 244/3.1 |
| 6,016,990 A * | 1/2000 | Small | ............... | F41G 7/305 244/3.11 |
| 6,311,108 B1 | 10/2001 | Ammar et al. | | |
| 6,398,155 B1 * | 6/2002 | Hepner | ............... | F41G 7/305 244/3.15 |
| 6,450,442 B1 * | 9/2002 | Schneider | ............... | F41G 7/305 244/3.14 |
| 6,572,052 B1 * | 6/2003 | Hansen | ............... | F41G 7/305 244/3.11 |
| 6,611,141 B1 * | 8/2003 | Schulz | ............... | G01C 21/165 324/207.12 |
| 6,724,341 B1 * | 4/2004 | Pereira | ............... | F42B 15/01 244/3.1 |
| 6,727,843 B1 * | 4/2004 | Hansen | ............... | F41G 7/305 244/3.1 |
| 2005/0156777 A1 | 7/2005 | King et al. | | |
| 2005/0184192 A1 * | 8/2005 | Schneider | ............... | F41G 7/305 244/3.1 |
| 2006/0163422 A1 * | 7/2006 | Krikorian | ............... | F41G 7/303 244/3.14 |
| 2007/0068373 A1 | 3/2007 | McCantas, Jr. | | |
| 2010/0220002 A1 * | 9/2010 | Rastegar | ............... | F41G 7/305 342/62 |
| 2011/0160941 A1 | 6/2011 | Garrec et al. | | |
| 2012/0199690 A1 * | 8/2012 | Rastegar | ............... | F42B 15/01 244/3.19 |
| 2016/0363659 A1 | 12/2016 | Mindell et al. | | |

OTHER PUBLICATIONS

International Search Report, PCT/US20/45161, dated Oct. 20, 2020, 8 pages.

* cited by examiner

ATTITUDE DETERMINATION BY PULSE BEACON AND LOW COST INERTIAL MEASURING UNIT

FIELD OF THE DISCLOSURE

The present disclosure relates to precision guidance and targeting and more particularly to attitude determination using a pulse beacon and a low cost inertial measuring unit.

BACKGROUND OF THE DISCLOSURE

Today's projectile navigation systems use expensive inertial measurement units (IMUs) to measure a projectile's attitude. Attitude is the orientation of an object (e.g., a projectile) relative to its direction of travel. The necessary cost, weight, and power for the expensive IMUs overwhelm the system's performance metrics and the system's ability to produce a low cost, small, and effective projectile.

Wherefore it is an object of the present disclosure to overcome the above-mentioned shortcomings and drawbacks associated with the conventional precision navigation systems.

SUMMARY OF THE DISCLOSURE

One aspect of the present disclosure is a system for attitude determination, comprising: a pulse beacon located on a fire control system, the beacon being configured to deliver a sequence of timed pulses; a rearward facing sensor located on an airborne object, the sensor being configured to detect the sequence of timed pulses; a precision clock located on the airborne object and synchronized with the pulse beacon, the clock being configured to initiate a time stamp upon detection of a timed pulse by the rearward facing sensor; an IMU located on the airborne object, the IMU being configured to determine attitude of the airborne object and having an angle random walk (ARW)<0.1° SQRT(Hz) or tactical grade accuracy; a barometer or altitude sensor located on the airborne object, the barometer being configured to detect changes in altitude of the airborne object; and a processor located on the airborne object, the processor being configured to integrate data from at least the sensor, the clock, and the IMU and compare it to a pre-flight script of range, position, and altitude for the airborne object to determine a direction of arrival for the sequence of timed pulses, a range and a velocity for the airborne object based on an increasing time differential between pulses, and attitude of the airborne object.

One embodiment of the system is wherein the airborne object is a munition round or precision guided munition. In some embodiments of the system, the pulse beacon operates in the RF or IR spectrum.

Another embodiment of the system is wherein the sensor is a detector array or an antenna. In some cases, the system further comprises an up finding device configured to decompose the direction of arrival for the sequence of timed pulses detected by the sensor into pitch and yaw with an earth reference.

Yet another embodiment of the system is wherein the up finding device is a magnetometer, an onboard imager, or a polarized pulse beacon. In certain embodiments, the processor is further configured to calculate pitch and yaw in earth's reference to calibrate the IMU.

Another aspect of the present disclosure is a method of attitude determination, comprising: detecting a sequence of timed pulses from a pulse beacon via a rearward facing sensor located on an airborne object; synchronizing a precision clock located on the airborne object with the pulse beacon; initiating a time stamp upon detection of a timed pulse by the rearward facing sensor; determining an attitude of the airborne object via an IMU located on the airborne object, the IMU having an angle random walk (ARW)<0.1° SQRT(Hz) or tactical grade accuracy; detecting changes in altitude of the airborne object via a barometer located on the airborne object; integrating data from at least the sensor, the clock, and the IMU via a processor located on the airborne object; comparing the data from at least the sensor, the clock, and the IMU to a pre-flight script of range, position, and altitude for the airborne object; and determining a direction of arrival for the sequence of timed pulses, a range and a velocity for the airborne object based on an increasing time differential between pulses, and the attitude of the airborne object.

One embodiment of the method further comprises computing adjustments to account for crosswind and variations in the velocity of the airborne object.

Another embodiment of the method is wherein time intervals of pulses sent from the pulse beacon result in an increasing time lag that is directly proportional to the velocity of the airborne object thus generating a down range dispersion referred to as a miss distance or circular error probable.

Yet another embodiment is wherein the down range dispersion for a 100 Km projectile is improved to 10 to 100 meters versus 2-3 Km for a conventional system. In some cases, the airborne object is a munition round.

In some cases, the pulse beacon operates in the RF or IR spectrum. In certain embodiments, the sensor is a detector array or an antenna.

In still yet another embodiment, the method further comprises an up finding device configured to decompose the direction of arrival for the sequence of timed pulses detected by the sensor into pitch and yaw with an earth reference. In some cases, the up finding device is a magnetometer, an onboard imager, or a polarized pulse beacon. In certain embodiments, the processor is further configured to calculate pitch and yaw in earth's reference to calibrate the IMU.

Yet another aspect of the present disclosure is a method of attitude determination, comprising: pulsing IR or RF energy based on a predetermine pulse timing sequence; receiving the pulsed energy at a rearward facing sensor located on an airborne object; determining a direction of arrival (DOA) for the pulsed energy; initiating a time stamp using a precision clock when the pulsed energy is received by the sensor; determining range and velocity of an airborne object from an increasing differential due to an increased range along a flight path; calculating changes in altitude of the airborne object with respect to a fire control system; decomposing measured sensor angles into pitch and yaw in the earth's reference; calculating pitch and yaw in earth's reference and calibrating an IMU; and computing adjustments to account for crosswind and variations in the velocity of the airborne object.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Figure 1:
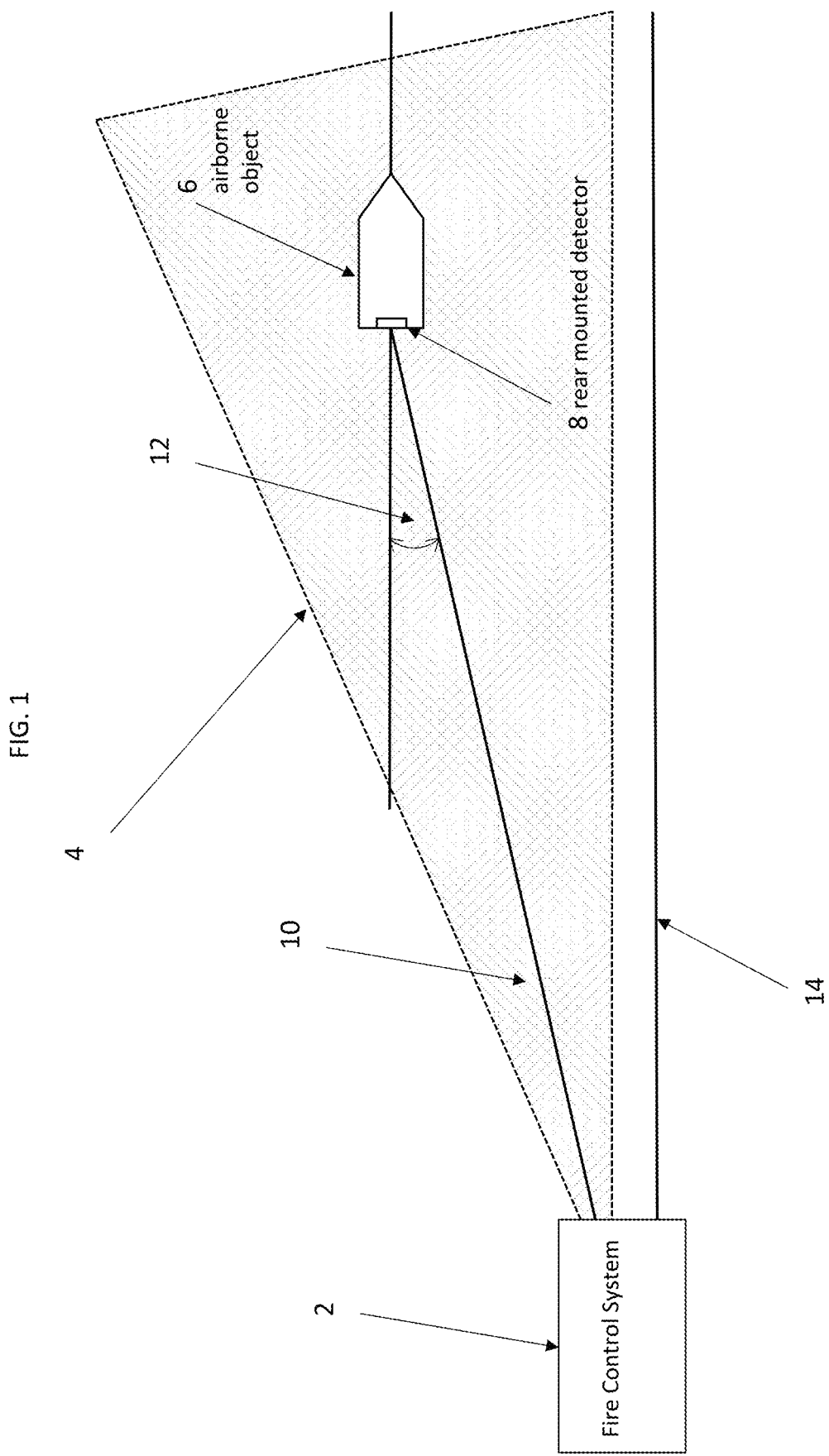
FIG. 1 is a diagram of one embodiment of the system of the present disclosure.

An object in flight can rotate in three dimensions: in reference to a winged aircraft, the dimensions are 1) yaw, nose left or right about an axis running up and down or normal to the object; 2) pitch, nose up or down about an axis running from wing to wing or lateral to the object; and 3) roll, rotation about an axis running from nose to tail or longitudinal to the object. These three axes are commonly referred to as an object's attitude. In precision guidance and targeting or navigation it is also important to know an object's positional distance along a trajectory (e.g., range from a fire control system or a target), the object's velocity, and its altitude (or distance above ground). In certain embodiments of the present disclosure, azimuth and elevation are also used to define the apparent position of the moving object relative to a ground-based observation point (e.g., on the fire control system). This is generally determined by a receiver or detector array located on the projectile.

Current range tracking systems are typically measured using RADAR or LIDAR located on a fire control system. This requires two path lengths (the first out to the object of interest and then a second back to the fire control system) for determination of the range. Thus, it becomes a $R^4$ rather than $R^2$ power problem. In such cases, a large RADAR/LIDAR system is needed for tracking a small target or object at a distance.

In contrast, one embodiment of the present disclosure uses a RF or an EO signal illuminating in a one direction using a detector located on-board a projectile for detection of a pulsed signal. This system reduces overall cost and provides for a projectile with the ability to determine its own range from the fire control system. This method allows for rough ranging using a communications link as a means of clocking the position of the projectile in relation to the fire control. Certain embodiments, require direct line of sight.

In certain embodiments of the system of the present disclosure, determining a range from the fire control system allows for a determination of a projectile's velocity. It is understood that projectiles' velocities can vary by a significant amount due, in part, variations in the actual explosion at launch. These variations can be attributed to the amount of explosive material, its age, the humidity, and the like. These are all factors that can amount to a variation of about 2-3% in a projectile's velocity at the time of launch. Over a duration of a flight this velocity squared term can cause a large overshot in the actual distance traveled and can cause missed targets or even cause a projectile to hit an incorrect target. In some cases, the variation in velocity occurs not just over the first 1% of a trajectory, but over the remaining 99%.

Especially with heavier projectiles, or rounds, it is important to know precisely where a round is and how fast it is moving. With some rounds spending about 5% of their flight in the air domain makes an early position of a round in flight a critical piece of information for more accurate targeting. In some cases, this improved accuracy early on in the flight can change a round's miss distances from about 1 km to tens of meters. As used herein, a round may be a projectile, a projectile, a ballistic, a bullet, a munition, or the like.

It has been recognized that attitude and position updates from a second sensor (e.g., a GPS), paired with a lower cost, smaller IMU provides an alternative approach to the use of expensive IMUs (10× cost of an inexpensive IMU). In one embodiment of the system of the present disclosure, the system determines a projectile's range from a fire control system with bearings detected by a rear facing sensor on the projectile (via Az and El information) which may be coupled with a barometer, and/or an "up finder" to establish a navigation solution.

In one embodiment, the up finder orientates the round (munition, projectile, projectile, or the like) relative to the fire control system to determine azimuth and elevation in earth coordinates. In certain embodiments, gyroscope data can be compared to the Az and El determined by the rearward looking sensor for real-time comparison to provide an inflight IMU/gyro calibration and thus remove any bias drift.

In other embodiments, the round has a pre-flight script for determining the Az and El, attitude, and/or position relative to the fire control system thereby providing a ground reference for the flight path. The flight path can then be used to keep the round in a direct linear path with no Az maneuvers or can be scripted to provide for controlled Az/El adjustment(s) to account for target position relative to a firing vector.

One aspect of the present disclosure is a system comprising an EO/IR or RF pulse beacon on a fire control system, a rearward facing sensor array on a projectile, an inexpensive IMU, a barometer, and a processor. In one embodiment, the data collected by the barometer, the IMU, and the sensor array is integrated and compared to a pre-flight script of range, position, and altitude for the projectile. In the case of a ballistic round/artillery, small adjustments are computed to account for crosswind, and variations in muzzle velocity, and the like. In certain embodiments, by clocking time intervals of pulses sent from the fire control pulse beam, a resulting increasing time lag is directly proportional to a velocity of the projectile shot from the fire control system, which generates a down range dispersion. In some cases the down rage dispersion is referred to as a miss distance or circular error probable. By measuring the time lag increase, and knowing the Az and El and/or attitude with relation to the fire control system detected by the rearward facing sensor array, the projectile can compensate for down range dispersion (typically +/−1 to 3 Km).

In one embodiment of the system, a short range (2 to 5 Km) 25 to 30 mm ballistic round may be used such that a volley of 5 to 10 rounds can be fired to intercept several UAS at several different locations. By providing each round with a separate pre-flight script, the pulse beam acts as a ground reference with each round acting independently. By coupling the flight dynamics for each round with expected crosswind range limits, the navigation system can predetermine needed maneuvers based on range and fire control bearings detected via the rear facing sensor array.

In certain embodiments of the system of the present disclosure, by measuring the yaw and/or Az relative to the fire control system, the amount of crosswind (crabbing trajectory) can be measured and accounted for by the navigation system. A crosswind generates a lateral motion of the round that when divided by the range, a small angle change is generated in the yaw relative to the fire control system. A lack of cross wind would result in no change in yaw attitude.

Referring to FIG. 1, a diagram of one embodiment of the system of the present disclosure is shown. More specifically, a fire control system 2 is shown projecting an RF or EO signal 4. In some cases, the signal is comprised of pulses. An airborne object 6 receives the signal from the fire control using a rear mounted detector 8. In certain embodiments, the airborne object is a round. Using the rear mounted detector, a range 10 from the fire control (FC) system 2 can be determined. Range relative to earth position 14 can also be determined. The detector 8, or sensor, measures the angle 12 between the body frame of the object and the fire control system. By tracking the range to the FC 10 or relative to the ground 14, one can determine the attitude of the air frame.

Certain embodiments of the present disclosure provide an earth reference to the object (e.g., a round) without relying on an inertial measuring unit (IMU) for attitude hold or bearing hold. These functions can be accomplished by using a pulse beacon and a low cost IMU and using a rear tracking low cost SAL (semi-active laser) seeker to determine attitude in real-time to within 1 millirad and absolute angular position having no drift.

Figure 2:
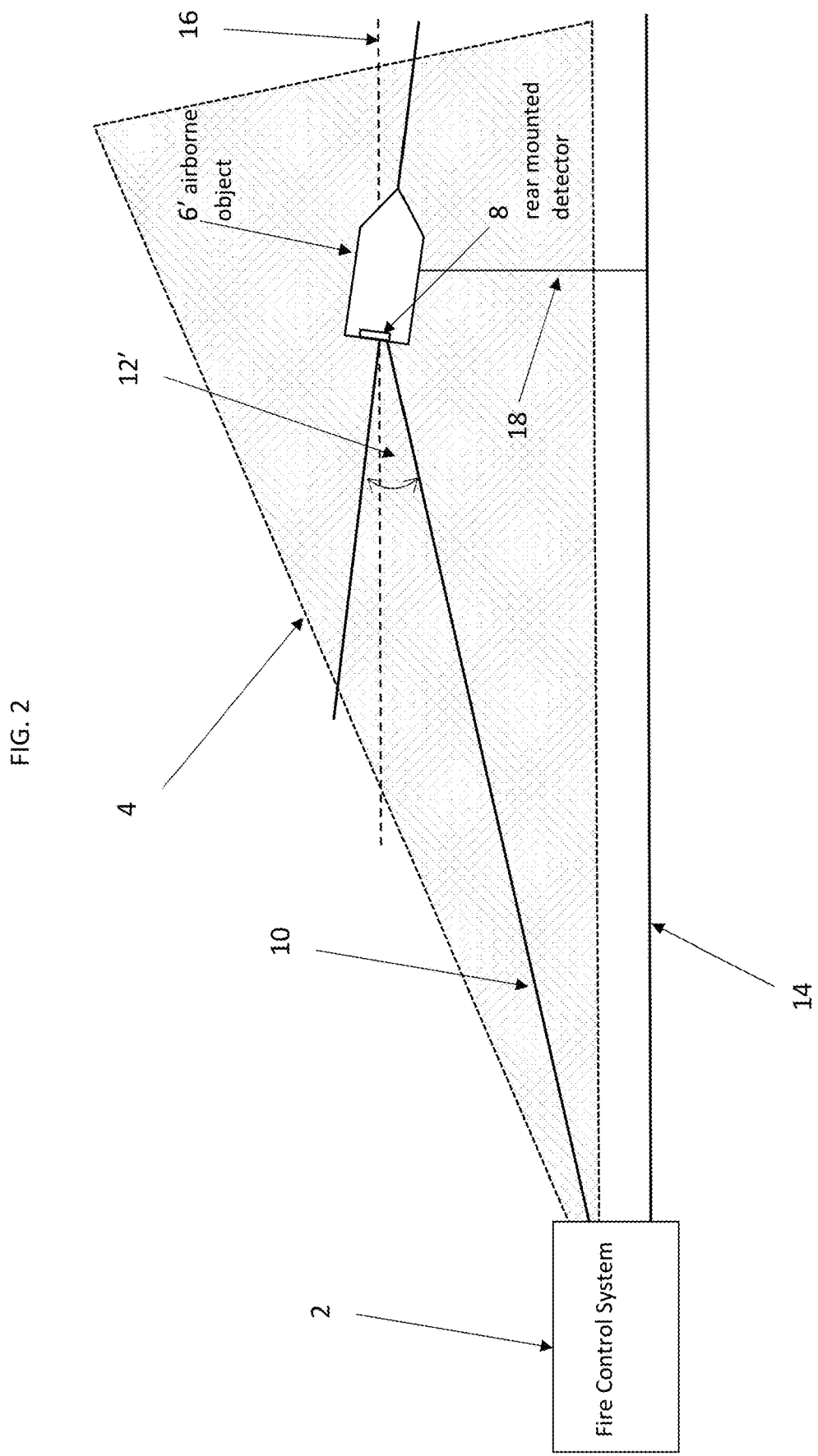
FIG. 2 is a diagram of a side view of one embodiment of the system of the present disclosure showing pitch.

Referring to FIG. 2, a diagram of a side view of one embodiment of the system of the present disclosure showing pitch is shown. More specifically, a fire control system 2 is shown projecting an RF or EO signal 4. In some cases, the signal is comprised of pulses. An airborne object 6' receives the signal from the fire control 2 using a rear mounted detector 8. Using the rear mounted detector 8, a range 10 from the fire control (FC) system 2 can be determined. Range relative to earth position 14 can also be determined. The detector 8, or sensor, measures the angle 12' between the body frame of the object and the fire control system. By tracking the range to the FC 10, or relative to the ground 14, one can determine the attitude of the air frame. Altitude 18 is measured by an altimeter sensor.

In certain embodiments, timing is synchronized between the round and the FC. In some cases, the range relative to an earth position is measured with a GPS or using image navigation. In one embodiment, by knowing two out of the three legs of the triangle of information (altitude, range, and attitude) one can determine the angle between the dotted line and the FC pulse beacon. The sensor measures between the solid line and the FC 12'. The difference is the attitude measurement for the object, here the object's pitch. In certain embodiments, if the GPS location is within 10 meters, at 2 Km the attitude is calculated to within 5 mrads. At 4 Km, the attitude is calculated to within 2.5 mrads.

Current low cost SAL seekers are comprised of a 2D array mounted on the nose of a round. In certain embodiments, the SAL seeker function is rotated to be rear-facing and is coupled with a pulse beacon emitting from the fire control. There, the sensor 8 measures the angle rates within 0.2 to 1 mrads (depending on the optics) and when combined with a lower cost IMU, would yield higher level IMU performance without the cost of the higher level IMU. By tracking range and altitude (e.g., using a low cost pressure sensor) the attitude relative to the launch platform can be determined. This approach blends optical communications, up-finding or ranging with attitude measurement on the projectile. With the use of a laser or pulse diode one can accurately determine attitude of a projectile relative to the fire control system at a low system cost.

Figure 3:
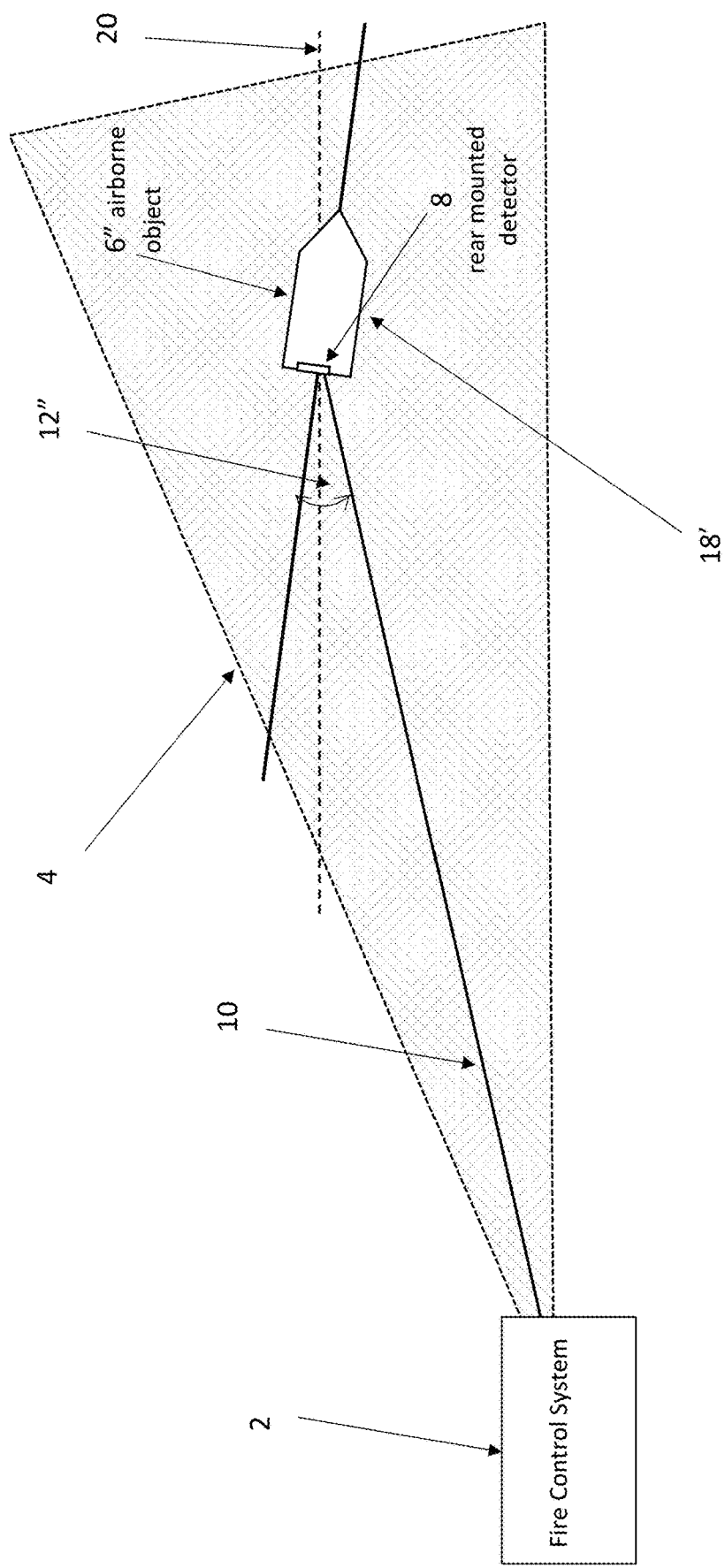
FIG. 3 is a diagram of a top view of one embodiment of the system of the present disclosure showing yaw.

Referring to FIG. 3, a diagram of a top view of one embodiment of the system of the present disclosure showing yaw is shown. More specifically, ground is the page. A fire control system 2 is shown projecting an RF or EO signal 4. In some cases, the signal is comprised of pulses. An airborne object 6" receives the signal from the fire control 2 using a rear mounted detector 8. Using the rear mounted detector 8, a range 10 from the fire control (FC) system 2 can be determined. Range relative to earth position can also be determined. The detector 8, or sensor, measures the angle 12" between the body frame of the object and the fire control system, by tracking the range to the FC 10 one can determine the attitude of the air frame.

In certain embodiment, timing is synchronized between the round and the FC. In some cases, the range relative to an earth position is measured with a GPS or using image navigation. In one embodiment, by knowing two out of the three legs of the triangle of information (altitude, range, and attitude) one can determine the angle between the dotted line and the FC pulse beacon. The sensor measures between the solid line and the FC 12". The difference is the attitude measurement of the object, here the object's yaw. In certain embodiments, if the GPS location is within 10 meters, at 2 Km the attitude is calculated to within 5 mrads. At 4 Km, the attitude is calculated to within 2.5 mrads.

In one embodiment of the system of the present disclosure, a fire control system provides a forward looking pulse beacon, either in the RF or the IR/OE spectrum that covers the trajectory for or expected flight path of a round. The energy from the pulse beacon is received by a sensor array (either RF or IE/EO) located on the round. The sensor array provides the angle measurement (e.g., to about 1 mrad) from the round and relative to the fire control system. In one embodiment, IR/EO provides higher angular accuracy and is effective from about 2 Km to up to about 15 Km (on clear days). In another embodiment, RF provides extended range as compared to the IR/EO and is only limited by Line of Sight (LOS), but this is at the expense of angular accuracy (e.g., to about 4 to about 10 mrads).

In certain embodiments, the pulse beacon's energy is received by the IR/EO sensor array or the RF antenna assembly and is then processed to determine the direction of arrival (DOA) for the incoming signal. In certain embodiments, other sensors provide range through pulse Time of Arrival (TOA) measurements, altitude from a barometer or active RF RADAR or an EO laser range finder (LRF). In some embodiments, the pitch attitude can be determined via the angle between the measured sensor array and the fire control system minus the arc-cosine (altitude/range), See, e.g., FIG. 2.

In certain embodiments, the yaw or Az can be measured directly from the sensor array. In a pure ballistic fight, for example, the fire control beacon would be at the center of the sensor array. Cross wind, perpendicular to the flight, will add yaw angle drift along the flight path. This can be measured and then compensated for by adding a correcting bias to the yaw tracking point allowing the round to slightly crab into the wind.

An up and down sensor allows the projectile to decouple the motion in the yaw and pitch directions relative to the earth environment. In some cases, Az and/or yaw do need to account for gravity, where pitch and the control need to account for gravity in any control function.

Figure 4:
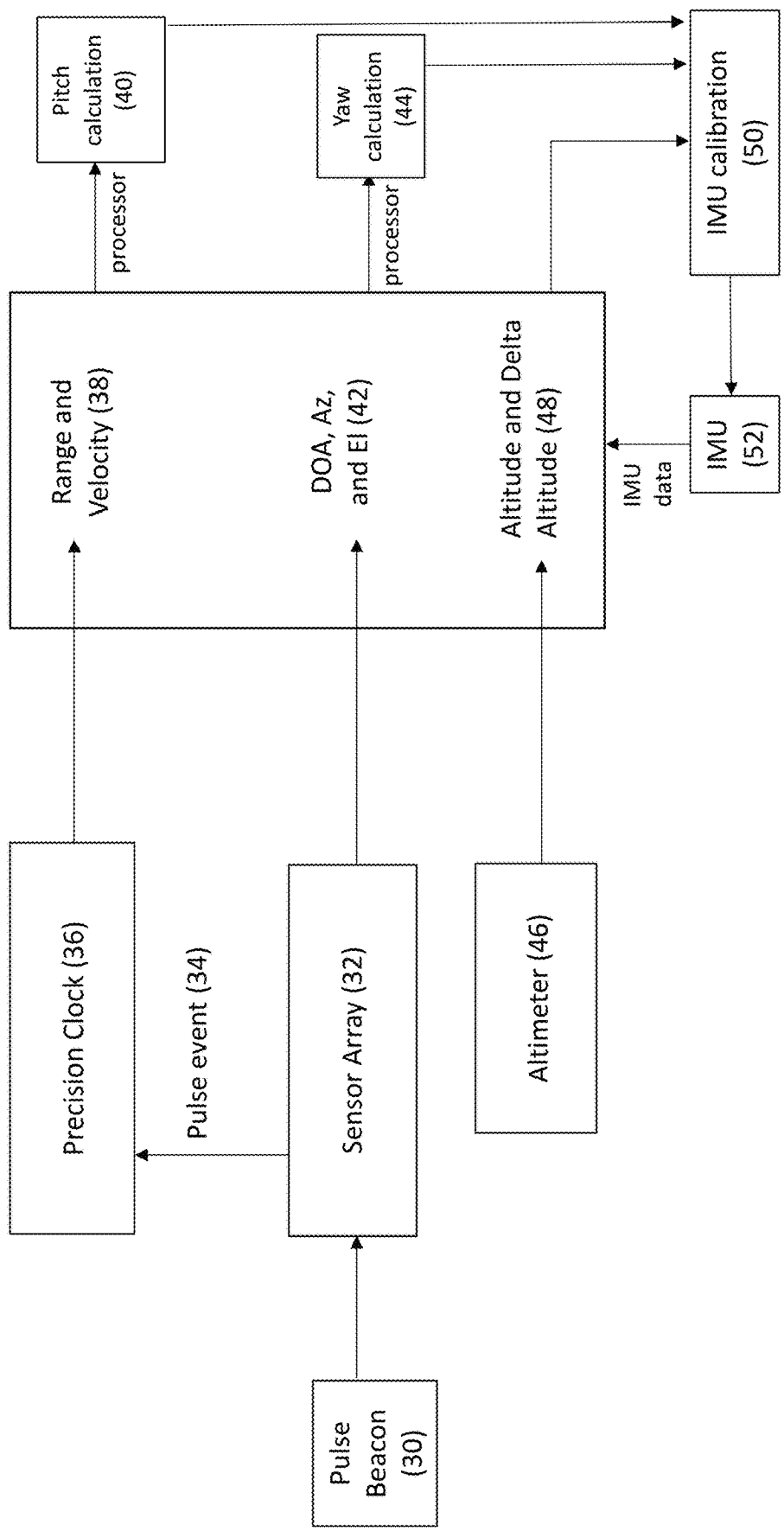
FIG. 4 is a diagram of one embodiment of an on-board ranging system according to the principles of the present disclosure.

Referring to FIG. 4, a diagram of one embodiment of an on-board ranging system according to the principles of the present disclosure is shown. More specifically, a pulse beacon 30 provides a pulsed signal in RF or IR spectrum. The pulse beacon is located on a fire control system, or the like. A detector or receiver 32 located on an airborne object determines the direction of arrival (DOA) for the signal emitted from the pulse beacon. The DOA and Az and El measurements 42 provide for calculation of yaw 44 for the airborne object. In some cases, for each pulse event 34 a precision clock 36 determines the velocity of the object as well as the range of the object with respect to the pulse beacon 38. These measurements provide for calculation of the pitch for the object 40. In certain embodiments, an altimeter 46, or the like, provides for the altitude of the object from launch point and the any deltas in altitude for the object 48 along its flight path. The altimeter, sensor array or detector, and precision clock all may be used for IMU calibration 50 such that the use of a low cost IMU 52 still provides for robust accuracy as if a high level IMU was used in the system but with reduced requirements (cost, power, etc.).

One embodiment of a method according to the principles of the present disclosure of attitude determination, a sequence of timed pulses from a pulse beacon are detected via a rearward facing sensor located on an airborne object. A precision clock located on the airborne object is synchronized with the pulse beacon and a time stamp is initiated upon detection of a timed pulse by the rearward facing sensor. An attitude of the airborne object is determined using an IMU located on the airborne object, the IMU having an angle random walk (ARW)<$0.1°$ SQRT(Hz) or tactical grade accuracy. In certain embodiments, the down range dispersion for a 100 Km projectile is improved to 10 to 100 meters versus 2-3 Km for a conventional system. Changes in altitude of the airborne object are detected via a barometer or altimeter located on the airborne object. In certain embodiments, the data from at least the sensor, the clock, and the IMU are integrated via a processor located on the airborne object. The data from at least the sensor, the clock, and the IMU are then compared to a pre-flight script of range, position, and altitude for the airborne object; and a direction of arrival for the sequence of timed pulses, a range and a velocity for the airborne object based on an increasing time differential between pulses, and the attitude of the airborne object can be determined.

Figure 5:
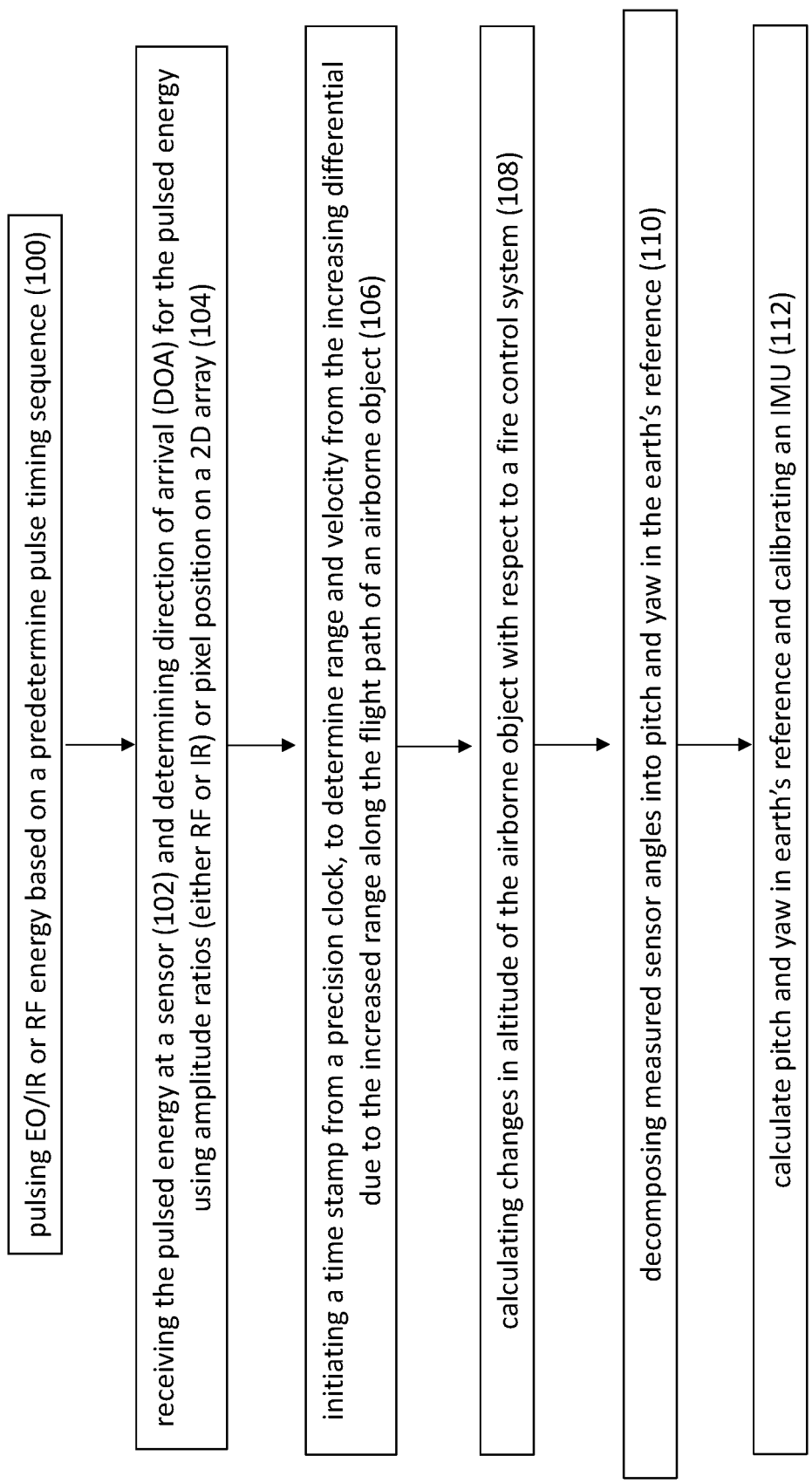
FIG. 5 is a flowchart of one embodiment of a method according to the principles of the present disclosure.

Referring to FIG. 5, a flowchart of one embodiment of a method according to the principles of the present disclosure is shown. More specifically, IR or RF energy is pulsed based on a predetermine pulse timing sequence 100 and the pulsed energy is received at a rearward facing sensor located on an airborne object 102. A direction of arrival (DOA) for the pulsed energy is determined 104. In some cases, a time stamp using a precision clock is initiated when the pulsed energy is received by the sensor 106. A range and velocity of an airborne object is determined from an increasing differential due to an increased range along a flight path. Changes in altitude of the airborne object with respect to a fire control system are calculated 108. In some cases, measured sensor angles are decomposed into pitch and yaw in the earth's reference 110 and pitch and yaw in earth's reference are calculated and are used in calibrating an IMU 112. In some cases, adjustments are computed to account for crosswind and variations in the velocity of the airborne object.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A system for attitude determination of an airborne object, comprising:
   a pulse beacon located on a fire control system, the beacon being configured to deliver a sequence of timed pulses;
   a rearward facing sensor configured to detect the sequence of timed pulses;
   a clock located and synchronized with the pulse beacon, the clock being configured to initiate a time stamp upon detection of the timed pulses by the rearward facing sensor;
   an inertial measurement unit (IMU), the IMU configured to determine attitude of the airborne object;
   a barometer or altitude sensor configured to detect changes in altitude of the airborne object; and
   a processor configured to integrate data from at least the sensor, the clock, and the IMU and compare it to a pre-flight script of range, position, and altitude for the airborne object to determine a direction of arrival for the sequence of timed pulses, a range and a velocity for the airborne object based on an increasing time differential between pulses, and attitude of the airborne object.

2. The system according to claim 1, wherein the airborne object is a munition round.

3. The system according to claim 1, wherein the pulse beacon operates in the RF or IR spectrum.

4. The system according to claim 1, wherein the sensor is a detector array or an antenna.

5. The system according to claim 1, further comprising an up finding device configured to decompose the direction of arrival for the sequence of timed pulses detected by the sensor into pitch and yaw with an earth reference.

6. The system according to claim 5, wherein the up finding device is a magnetometer, an onboard imager, or a polarized pulse beacon.

7. The system according to claim 1, wherein the processor is further configured to calculate pitch and yaw in earth's reference to calibrate the IMU.

8. The system according to claim 1, wherein the IMU has an angle random walk (ARW)<0.1° SQRT(Hz) or tactical grade accuracy.

9. A method of attitude determination, comprising:
   detecting a sequence of timed pulses from a pulse beacon via a rearward facing sensor located on an airborne object;
   synchronizing a precision clock located on the airborne object with the pulse beacon;
   initiating a time stamp upon detection of a timed pulse by the rearward facing sensor;
   determining an attitude of the airborne object via an inertial measurement unit (IMU) located on the airborne object;
   detecting changes in altitude of the airborne object via a barometer located on the airborne object;
   integrating data from at least the sensor, the clock, and the IMU via a processor located on the airborne object;
   comparing the data from at least the sensor, the clock, and the IMU to a pre-flight script of range, position, and altitude for the airborne object; and
   determining a direction of arrival for the sequence of timed pulses, a range and a velocity for the airborne object based on an increasing time differential between pulses, and the attitude of the airborne object.

10. The method according to claim 9, further comprising computing adjustments to account for crosswind and variations in the velocity of the airborne object.

11. The method according to claim 10, wherein the down range dispersion for a 100 Km projectile is improved to 10 to 100 meters versus 2-3 Km for a conventional system.

12. The method according to claim 9, wherein time intervals of pulses sent from the pulse beacon result in an increasing time lag that is directly proportional to the velocity of the airborne object thus generating a down range dispersion referred to as a miss distance or circular error probable.

13. The method according to claim 9, wherein the airborne object is a round.

14. The method according to claim 9, wherein the pulse beacon operates in the RF or IR spectrum.

15. The method according to claim 9, wherein the sensor is a detector array or an antenna.

16. The method according to claim 9, further comprising an up finding device configured to decompose the direction of arrival for the sequence of timed pulses detected by the sensor into pitch and yaw with an earth reference.

17. The method according to claim 16, wherein the up finding device is a magnetometer, an onboard imager, or a polarized pulse beacon.

18. The method according to claim 9, wherein the processor is further configured to calculate pitch and yaw in earth's reference to calibrate the IMU.

19. The method according to claim 9, wherein the IMU has an angle random walk (ARW)<0.1° SQRT(Hz) or tactical grade accuracy.

20. A method of attitude determination of a projectile, comprising:
   pulsing infrared (IR) or radio frequency (RF) energy based on a predetermine pulse timing sequence;
   receiving the pulsed energy at a rearward facing sensor located on the projectile;
   determining a direction of arrival (DOA) for the pulsed energy;
   initiating a time stamp using a precision clock when the pulsed energy is received by the sensor;
   determining range and velocity of the projectile from an increasing differential due to an increased range along a flight path;
   calculating changes in altitude of the airborne object with respect to a fire control system;
   decomposing measured sensor angles into pitch and yaw in earth's reference;
   calculating pitch and yaw in earth's reference and calibrating an inertial measurement unit (IMU); and
   computing adjustments to account for crosswind and variations in the velocity of the projectile.

* * * * *